(12) United States Patent
Chirravuri et al.

(10) Patent No.: US 11,153,162 B2
(45) Date of Patent: Oct. 19, 2021

(54) COMMUNICATIONS NETWORK INCLUDING INTELLIGENT NETWORK SERVICE MANAGER

(71) Applicant: RAYTHEON COMPANY, Waltham, MA (US)

(72) Inventors: Jagannath Chirravuri, Medfield, MA (US); John P. Denorscia, Berlin, MA (US); Richard William Smith, Arlington, VA (US); Marina Gurevich, Huntington Beach, CA (US); Michael Gibbons, West Roxbury, MA (US)

(73) Assignee: RAYTHEON COMPANY, Waltham, MA (US)

( * ) Notice: Subject to any disclaimer, the term of this patent is extended or adjusted under 35 U.S.C. 154(b) by 35 days.

(21) Appl. No.: 16/427,956

(22) Filed: May 31, 2019

(65) Prior Publication Data

US 2020/0382368 A1 Dec. 3, 2020

(51) Int. Cl.
*H04L 12/24* (2006.01)

(52) U.S. Cl.
CPC .......... *H04L 41/0816* (2013.01); *H04L 41/16* (2013.01)

(58) Field of Classification Search
CPC .............................. H04L 43/0811; H04L 41/16
See application file for complete search history.

(56) References Cited

U.S. PATENT DOCUMENTS 7,343,222 B2 3/2008 Solomon
8,726,379 B1 5/2014 Stiansen et al.
2003/0021283 A1 1/2003 See et al.
2012/0317290 A1 12/2012 Taylor
2018/0091369 A1 3/2018 Cunningham et al.
2019/0140340 A1* 5/2019 Ramasamy .......... H01Q 1/2291
2020/0096953 A1* 3/2020 Stalker ................... H05B 47/22

FOREIGN PATENT DOCUMENTS

CN 102487293 B 9/2014

OTHER PUBLICATIONS

International Search Report and Written Opinion for International Application No. PCT/US2020/025289; Application Filing Date Mar. 27, 2020; dated Jun. 16, 2020 (15 pages).
Ayoubi, Sara, et al. "Machine learning for cognitive network management." IEEE Communications Magazine 56.1 (2018): 158-165.

* cited by examiner

*Primary Examiner* — Suraj M Joshi
(74) *Attorney, Agent, or Firm* — Cantor Colburn LLP

(57) ABSTRACT

A multi-function communications network includes a front-end communications network in signal communication with a plurality of communication nodes. Each communication node includes a plurality of discrete network elements. One or more network element adapters are in signal communication with a respective network element among the plurality of discrete network elements. A network management system is in signal communication with the network element adapters. The network management system is configured to generate reconfiguration parameters in response to an operating disruption of at least one affected node among the plurality of communication nodes. At least one of the network elements included in the affected node is reconfigured based at least in part on the reconfiguration parameters.

20 Claims, 3 Drawing Sheets

COMMUNICATIONS NETWORK INCLUDING INTELLIGENT NETWORK SERVICE MANAGER

BACKGROUND

The present invention relates to data communications systems, and more specifically, to multi-function satellite communications networks.

Traditional military-grade communication systems such as satellite communications (SATCOM) system, for example, are often implemented using a multitude of point-to-point (P2P) data communication links. These P2P links are used to connect a variety of different spectral frequency nodes including, but not limited to, SATCOM nodes, low-frequency nodes, high-frequency nodes and ultra-high frequency (UHF) nodes. The different spectral frequency nodes are typically utilized by different services of sub-systems that operate as an individual homogenous network. For example, electronic warfare (EW) sub-systems may operate as a group of UHF nodes, while data communication sub-systems may operate as a group of low-frequency nodes. Nodes categorized according to a particular spectral frequency are typically managed by an independent controller or control system. Thus, SATCOM nodes and their corresponding services (e.g., EW services) may be managed by a first controller, low-frequency nodes may be managed by a second controller, high-frequency nodes may be managed by a third controller, etc.

SUMMARY

According to a non-limiting embodiment, a multi-function communications system comprises a front-end communications network in signal communication with a plurality of communication nodes. Each communication node includes a plurality of discrete network elements. One or more network element adapters are in signal communication with a respective network element among the plurality of discrete network elements. A network management system is in signal communication with the network element adapters. The network management system is configured to generate reconfiguration parameters in response to an operating disruption of at least one affected node among the plurality of communication nodes. At least one of the network elements included in the affected node is reconfigured based at least in part on the reconfiguration parameters.

According to another non-limiting embodiment, a network management system comprises a network manager controller in signal communication with a plurality of network element adapters. Each network element adapter is in signal communication with a respective network element included in at least one communication node installed in the multi-function communications network. An intelligent network services manager (ISM) controller is in signal communication with the network manager controller. The ISM controller is configured to determine at least one course of action (CoA) based on an operating disruption of the at least one communication node, and to generate reconfiguration parameters for reconfiguring at least one of the network elements based at least in part on the at least one CoA.

According to yet another non-limiting embodiment, a method of operating a multi-function communications network comprises exchanging data between a plurality of communication nodes and front-end communications network. Each communication node among the plurality of communication nodes includes a plurality of discrete network elements. The method further comprises exchanging data between a plurality of network element adapters and a respective network element among the plurality of discrete network elements; and generating, via a network management system in signal communication with the plurality of network element adapters, reconfiguration parameters in response to an operating disruption of at least one affected node among the plurality of communication nodes. The method further comprises reconfiguring at least one of the network elements included in the at least one affected node based at least in part on the reconfiguration parameters.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE SEVERAL VIEWS OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
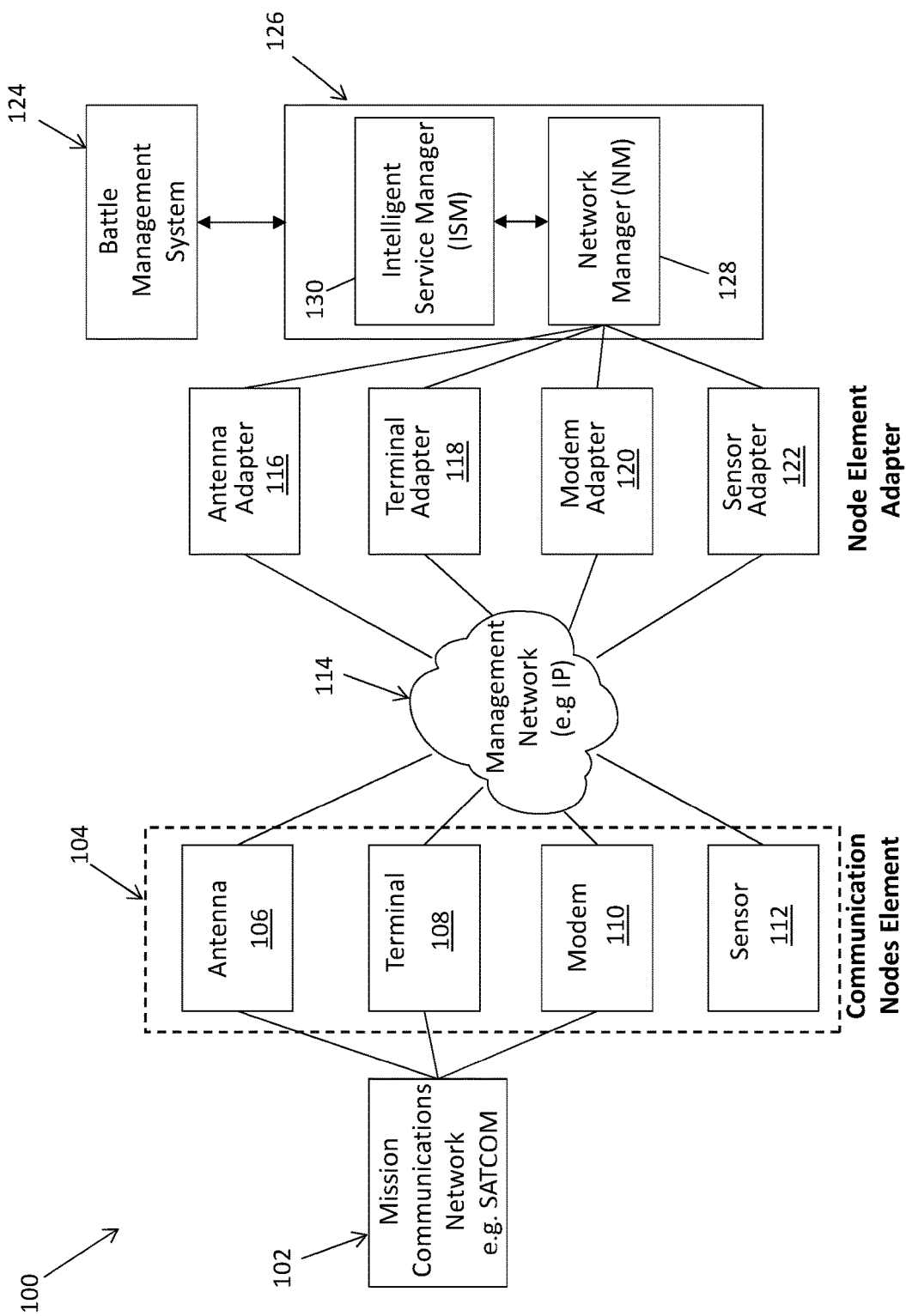
FIG. 1 is a block diagram of a multi-function communications network according to a non-limiting embodiment.

The diagrams depicted herein are illustrative. There can be many variations to the diagram or the operations described therein without departing from the spirit of the invention. For instance, the actions may be performed in a differing order or actions may be added, deleted or modified.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are relevant to the inventive teachings described herein, traditional multi-function communications networks have implemented various defense and security techniques to facilitate fault tolerance and minimize susceptibly to external stimuli such as network jamming and adversarial cyberattacks. These traditional defense and security techniques include, for example, dynamic spectrum allocation, dynamic path and bandwidth management, network management and policy-based network management procedures which aim to reconfigure a network that has been subjected to a natural and/or artificial (e.g., human generated cyberattack) disturbance. However, once a network disturbance is detected, the traditional defense and security techniques described above require manual intervention to reconfigure one or more communications links to mitigate link failures and maintain continued operation of a given network sub-system or service.

Various non-limiting embodiments described herein provide a multi-function communications network that disaggregates network endpoints into individual network elements (NEs) based on functionality. For instance an endpoint can be disaggregated into an antenna NE, a modem NE, a crypto NE, a baseband NE, and an operator interface. The multi-function communications network further includes an intelligent network services manager (ISM) controller that facilitates heterogeneous network management among various types of services, sub-systems and NEs. For example, the ISM controller is configured to collect and analyze information for all types of communication nodes, sensor nodes, service nodes (e.g., cyber nodes, EW nodes, etc.) and their respective node controllers and NEs to automatically route information within the communications network. Accordingly, the ISM can mitigate any node failure by processing inputs from the multi-function communications network together with information from the nodes and NEs. In response to detecting a disturbance, the ISM can dynamically reconfigure the network without loss of communication.

With reference now to FIG. 1, is a block diagram of a multi-function communications network 100 is illustrated according to a non-limiting embodiment. The multi-function communications network 100 includes a frontend communications system 102 such as a SATCOM system 102, for example, which is in signal communication with one or more network service nodes 104. The network service node 104 can include, but is not limited to, a cyber node, an EW node, etc. Each node 104 includes one or more discrete functional NEs. In this example, the node 104 includes an antenna element 106, a terminal elements 108, a modem element 110, and one or more sensor elements 112.

A back-end data management network 114 (e.g., an Ethernet, internet protocol (IP) network, etc.) facilitates data communication between each functional NE 106-112 and a respective is in signal communication with a respective NE adapter. The management network could be in-band with (e.g., telemetry) data using the same path as the bearer data (e.g. SATCOM data links) or out-of-band (such as an external IP network) In this example, the antenna NE 106 is in signal communication with an antenna NE adapter, the terminal NE 108 is in signal communication with a terminal NE adapter 118, the modem NE 110 is in signal communication with a modem NE adapter 120, and the sensor NE 112 is in signal communication with the sensor NE adapter 122. It should be appreciated that the node 104 can include various other types of individual NEs, which would allow for additional NE adapters.

The multi-function communications network 100 further includes a battle management system 124 and a network management system 126. The battle management system operates as a peer to the ISM provides the ISM with any changes in the battle field environment that could potentially impact communication systems. In the reverse case the ISM provides the battle management system with information on any impact and/or change in communications systems so that it can take appropriate course of action to successfully complete the mission. An example of this interaction is when a RF interference system is detected by the battle management system. The location and other information (e.g. frequency, waveform, intensity, and directionality) is passed onto the ISM. The ISM computes the impact to the communications systems in its purview and by reconfiguring the properties of appropriate NEs is able to ensure minimal impact on communications services and the flow of information. Another scenario is when the NEs report outages and/or degradation of service. The ISM corrects this degradation and at the same time if it determines that the battle management system could be impacted in performing its mission this information is passed on the battle management system which in turn determines an alternate course of action if necessary.

The network management system 126 includes a network manager controller 128 and an ISM controller 130. The network manager controller 128 receives data from each NE 106, 108, 110, 112 via its respective NE adapter 116, 118, 120, 122. Accordingly, the network manager controller 128 can aggregate the data and information received from the NE adapters 116, 118, 120, 122 to determine a real-time logical analysis of all the NEs 106, 108, 110, 112.

The ISM controller 130 exchanges data with the network manager controller 128 to store service information corresponding to the service or sub-system of a respective NE 106, 108, 110, 112. The service information includes, but is not limited to, the type of service, characteristics of the service (e.g., latency, jitter, frequency, number of components, etc.), service level agreements, service policies and service protocols. Based on the service information, the ISM controller 130 can determine all the available data routes or signal paths of each NE 106, 108, 110, 112 included in the multi-function communications network 100. In the event that one or more of the NEs 106, 108, 110, 112 are disrupted or fail, the ISM controller 130 is configured to determine one or more alternate data routes or alternate signal paths of a disrupted NE. Accordingly, a disrupted NE can be reconfigured so that it can maintain operating according the alternate data route or alternate signal path.

Figure 2:
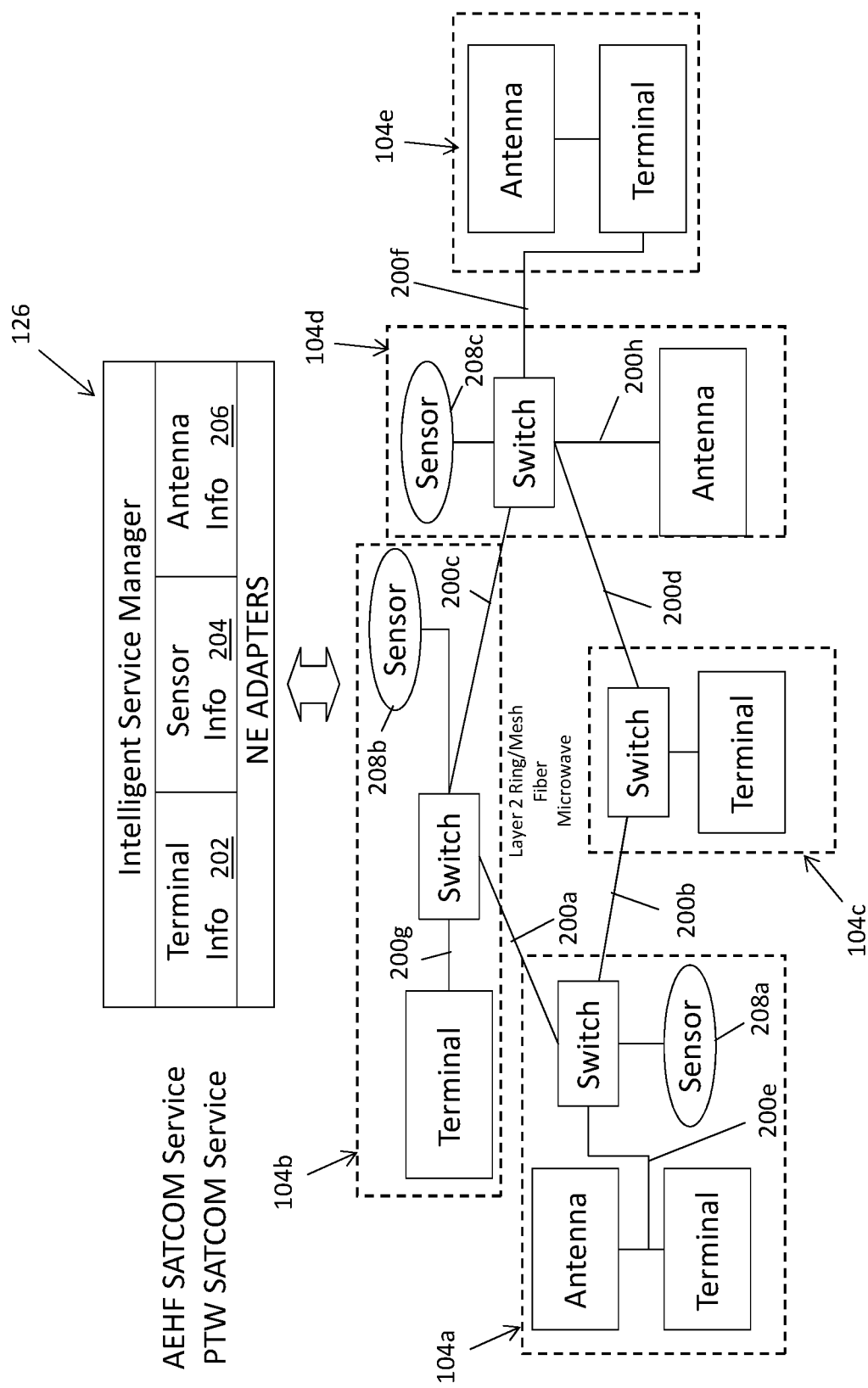
FIG. 2 illustrates an ISM controller capable of determining signal paths of a plurality of nodes is illustrated according to a non-limiting embodiment.

Turning to FIG. 2, an ISM controller 130 capable of determining signal paths 200a, 200b, 200c, 200d, 200e, 200f, 200g, and 200h of a plurality of nodes 104a 104b, 104c and 104d is illustrated according to a non-limiting embodiment. The ISM controller 130 stores terminal NE configuration information 202, sensor NE configuration information 204 and antenna NE configuration information 206. The configuration information 202, 204 and 206 indicates the signal paths 200a, 200b, 200c and 200d available to a given 104a 104b, 104c and 104d. Accordingly, if the antenna NE of node 104e fails, the ISM controller 130 can reconfigure the terminal of node 104e and/or the antenna of node 104d. Accordingly, the ISM controller 130 can operate the switch of node 104d so that the terminal NE of node 104e can utilize the antenna of node 104d using signal paths 200f and 200h. Similarly, if the terminal NE of node 104e fails, the ISM controller 130 can reconfigure the antenna of node 104e and/or the terminal of node 104c. Accordingly, the ISM controller 130 can operate the switch of node 104d so that the antenna NE of node 104e can utilize the terminal of node 104c via signal paths 200f and 200d.

Still referring to FIG. 2, one or more sensors 208a, 208b, 208c are provided, which can alert to a disruption on a signal path and/or node. For example, sensor 208a can detect or predict a disruption in node 104a, and generate an alert that is delivered to the ISM controller 130. A distribution can be determined by applying an encryption to one or more of the signal paths 200a, 200b, 200c, 200d, 200e, 200f, 200g, and 200h. The encryption secures transmission of data bits and bytes (packets) delivered over the paths (or links). In addition, anti-spoofing techniques e.g. tagging each message with a sequence number and time stamp ensures no spoofing. The encryption employs an anti-spoofing operation, which includes assigning a predetermined or known sequence of packets between nodes connected to one another via a signal path. Packets transmitted on the signal paths 200a, 200b, 200c, 200d, 200e, 200f, 200g, and 200h are then monitored by the sensors 208a, 208b, 208c, and a disruption or deviation in the sequence of packets from the known packets results in an alert from one or more of the sensors 208a, 208b, 208c The ISM controller 130 analyzes the node 104a to determine possible causes of the disruption, and generates one or more course of actions (CoAs). The CoAs include, for example, identifying alternate signal paths and/or reconfiguration parameters that allow one or more NEs of mode 104a to maintain operation without data loss.

Figure 3:
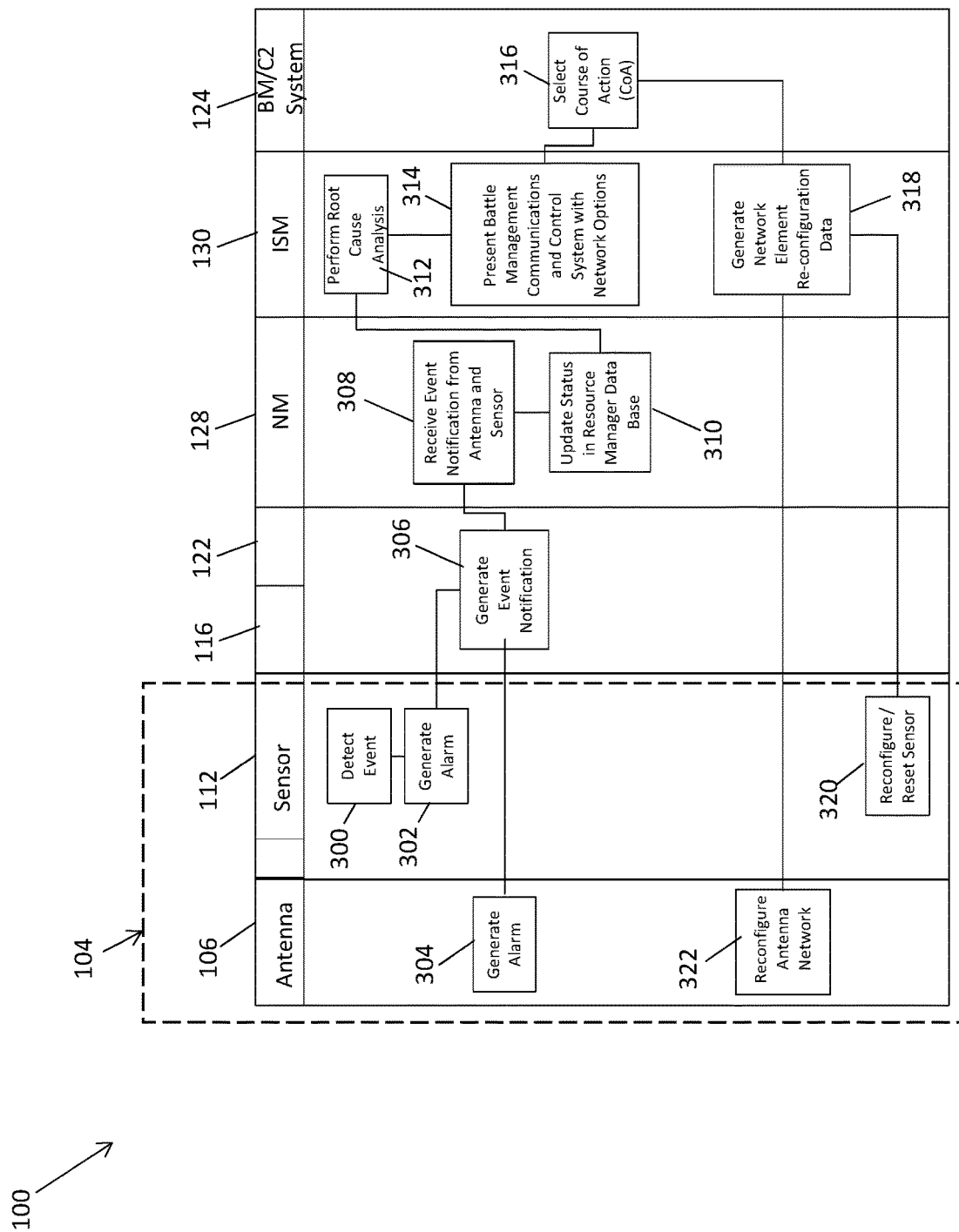
FIG. 3 is a signal flow diagram illustrates data communication in a multi-function communications network according to a non-limiting embodiment.

Turning to FIG. 3, a signal flow diagram illustrates data communication in a multi-function communications network 100 according to a non-limiting embodiment. At operation 300, a sensor 112 associated with node 104 detects a disturbance or deviation from the node's expected operation. Accordingly, the sensor 112 generates and alarm at operation 302. The antenna 106 included in the node 104 also generates an alarm at operation 304.

The alarms generated at operations 302 and 304 are delivered to the antenna adapter 116 and the sensor adapter 122. Accordingly, each of the antenna adapter 116 and the sensor adapter 122 generates an event notification. The event notification provides information on the detected disturbance. For example, the event notification can indicate changes in frequency, changes in power output, changes in data output, disconnection events, changes in data packet delivery in one or more signal paths, etc.

The network manager 128 receives the event notifications at operation 308, and determines whether a given network element (e.g., the antenna 106 and/or the sensor 112) is operating according to a normal operating status or a disrupted operating status. Accordingly, the network manager 128 updates the operating status of the antenna 106 and the sensor 112 in a resource manager data base at operation 310. The operating status update can include, for example, which NEs (e.g., the antenna 106 and the sensor 112) are disrupted or affected by the detected disturbance.

The ISM 130 receives the event notifications and status updates and performs a root cause analysis of the detected disturbance at operation 312. Based on the analysis, the ISM 130 generates one or more CoAs at operation 314. The CoAs include various network management operations that can maintain the service or similar service (e.g., a degraded service) provided by the disturbed node. The CoAs include, but are not limited to, reconfiguring one or more NEs of the disrupted node (e.g., node 104), re-routing signal paths and/or data routes of one or more of the NEs, adding nodes and/or disconnecting nodes.

The battle management system 124 receives the available CoAs provided by the ISM 130 and selects a given CoA at operation 316. The CoA selected by the battle management system 124 is then returned to the ISM 130 at operation 318. In turn, the ISM 130 generates the NE reconfiguration data for reconfiguring the NEs to achieve the selected COA at operation 318.

The NE reconfiguration data is provided to the antenna adapter 116 and the sensor adapter 122. Accordingly, the sensor NE 112 is reconfigured at operation 320 and the antenna NE 106 is reconfigured at operation 322. Reconfiguration of the antenna NE 106 can include, for example, dynamically adjusting the power output, operating frequency, signal paths between the antenna NE 106 and another NE component or service (e.g., a terminal NE). Reconfiguration of the sensor NE 112 can include, for example, dynamically adjusting the signal paths (e.g., inputs and/or outputs) of the sensor NE 112 and resetting the sensor NE 112.

The description of the present invention has been presented for the purpose of illustration. This description is not intended to be exhaustive or to limit the invention to the forms disclosed. Many modifications and variations will be apparent to those of ordinary skill in the art without departing from the scope and spirit of the invention. The embodiments of the invention discussed herein were chosen and described in order to best explain the principles of the invention and the practical applications, and to enable others of ordinary skill in the art to understand the invention. While certain embodiments of the invention have been described, it will be understood that those skilled in the art, both now and in the future, may make various improvements and enhancements that fall within the scope of the claims that follow.

What is claimed is:

1. A multi-function communications network comprising:
a front-end communications network;
a plurality of communication nodes in signal communication with the front-end communications network, each communication node among the plurality of communication nodes including a plurality of different types of discrete network elements configured to perform different communication services, the plurality of different types of discrete network elements including at least two elements selected among an antenna, a terminal, a modem, and a sensor;

a plurality of network element adapters, each network element adapter among the plurality of network element adapters in signal communication with a respective network element among the plurality of discrete network elements; and a network management system in signal communication with the plurality of network element adapters, the network management system including at least one controller configured to generate reconfiguration parameters in response to an operating disruption of at least one affected node among the plurality of communication nodes, the operating disruption comprising a failed discrete network element unable to perform a respective communication service, wherein at least one of the discrete network elements included in the at least one affected node is reconfigured based at least in part on the reconfiguration parameters, the reconfiguration parameters instructing the at least one affected node to communicate with a non-affected node among the plurality of communication nodes and utilize a non-failed discrete network element of the non-affected node that matches the failed discrete network element to perform the respective communication service, and wherein the reconfiguration parameters dynamically establishes a signal path directly between the non-failed discrete network element of the non-affected node and a non-failed discrete network element of the affected node such that the non-failed discrete network element of the non-affected node and the non-failed discrete network element of the affected node exchange data directly with one another to perform the respective communication service.

2. The multi-function communications network of claim 1, wherein the network management system includes an intelligent network services manager (ISM) controller configured to determine at least one course of action (CoA) based on the operating disruption, and generates the reconfiguration parameters based at least in part on the at least one CoA.

3. The multi-function communications network of claim 2, wherein each communication node among the plurality of communication nodes performs a different communication service.

4. The multi-function communications network of claim 3, wherein the at least one network element included in the at least one affected node is reconfigured while maintaining its communication service without data loss.

5. The multi-function communications network of claim 4, wherein each network element included in the plurality of discrete network elements is different from one another.

6. The multi-function communications network of claim 5, wherein the signal path is assigned a predetermined sequence of packets for exchanging data between the first and second communications node, and wherein the operating disruption is detected in response to detecting a disturbance in the predetermined sequence of packets.

7. The multi-function communications network of claim 6, further comprising a back-end communications network that establishes signal communication between a given network element and a respective network element adapter.

8. A network management system included in a multi-function communications network, the network management system comprising:

a network manager controller in signal communication with a plurality of network element adapters, each network element adapter in signal communication with a respective network element included in at least one communication node installed in the multi-function communications network, the network element selected among different types of network elements including an antenna, a terminal, a modem, and a sensor;

an intelligent network services manager (ISM) controller in signal communication with the network manager controller, the ISM controller configured to determine at least one course of action (CoA) based on an operating disruption of an affected node including a failed discrete network element unable to perform a respective communication service among the at least one communication node, and to generate reconfiguration parameters for reconfiguring at least one of the network elements based at least in part on the at least one CoA, wherein the reconfiguration parameters instruct the affected node to communicate with a non-affected node among the at least one communication node and to utilize a non-failed discrete network element included in the non-affected node that matches the failed discrete network element to perform the respective communication service, and wherein the reconfiguration parameters dynamically establishes a signal path directly between the non-failed discrete network element included the non-affected node and a non-failed discrete network element included in the affected node such that the non-failed discrete network element of the non-affected node and the non-failed discrete network element of the affected node exchange data directly with one another to perform the respective communication service.

9. The network management system of claim 8, wherein the network manager controller determines an operating status of the network element based at least in part on the operating disruption.

10. The network management system of claim 9, wherein the operating status of the network element is one of a normal operating status or a disrupted operating status.

11. The network management system of claim 10, wherein the at least one CoA is selected from a group comprising reconfiguring operating parameters of a disrupted operating status network element, re-routing signal paths, adding a communication node, and disconnecting a connection node.

12. The network management system of claim 11, wherein the ISM controller determines a plurality of signal paths connected to a plurality of communication nodes, and connects a node including a network element operating in a disrupted operating status from a first signal path to a second signal so as to perform a selected CoA.

13. The network management system of claim 12, wherein reconfiguring the operating parameters of a disrupted operating status network element includes one or both of dynamically adjusting a power output, and dynamically adjusting an operating frequency.

14. A method of operating a multi-function communications network comprising:

exchanging data between a plurality of communication nodes and front-end communications network, each communication node among the plurality of communication nodes including a plurality of different types of discrete network elements, the plurality of different types of discrete network elements including at least two elements selected among an antenna, a terminal, a modem, and a sensor;

exchanging data between a plurality of network element adapters and a respective network element among the plurality of discrete network elements; and generating, via a network management system in signal communication with the plurality of network element adapters, reconfiguration parameters in response to an operating disruption of at least one affected node among the plurality of communication nodes, the operating disruption comprising a failed discrete network element unable to perform a respective communication service; and reconfiguring at least one of the non-affected discrete network element included in the at least one affected node based at least in part on the reconfiguration parameters so as to dynamically establish a signal path directly between the reconfigured at least one non-affected discrete network element and a non-failed discrete network element included in a non-affected node among the plurality of communication nodes; and exchanging data, via the dynamically established signal path, directly between the reconfigured at least one non-affected discrete network element included the affected node and the non-failed discrete network element included in the non-affected node so as to perform the respective communication service.

15. The method of claim 14, further comprising:
determining, via an intelligent network services manager (ISM) controller, at least one course of action (CoA) based on the operating disruption; and
generating the reconfiguration parameters based at least in part on the at least one CoA.

16. The method of claim 15, performing a different communication services using each communication node among the plurality of communication nodes.

17. The method of claim 16, further comprising reconfiguring the at least one network element included in the at least one affected node while maintaining its communication service without data loss.

18. The method of claim 17, wherein each network element included in the plurality of discrete network elements is different from one another.

19. The method of claim 18, further comprising:
assigning the signal path a predetermined sequence of packets for exchanging data between the first and second communications node; and
detecting the operating disruption in response to detecting a disturbance in the predetermined sequence of packets.

20. The method of claim 19, further comprising establishing signal communication, via a back-end communications network, between a given network element and a respective network element adapter.

* * * * *